United States Patent
Rao et al.

(10) Patent No.: US 7,989,068 B2
(45) Date of Patent: Aug. 2, 2011

(54) ARTICLES HAVING AN INTERFACE BETWEEN A POLYMER SURFACE AND A MODIFIED GLASS SURFACE

(75) Inventors: Ashwin Rao, Norristown, PA (US); Satyen Trivedi, East Windsor, NJ (US); Jean-Christophe Castaing, Burlington, NJ (US); Jose Ruiz, Burlington, NJ (US); Charlie Aymes, Monmouth Junction, NJ (US); Amelie Grasset, Belesta-en-Lauragais (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 12/291,145

(22) Filed: Nov. 6, 2008

(65) Prior Publication Data

US 2009/0136754 A1    May 28, 2009

Related U.S. Application Data

(60) Provisional application No. 61/002,003, filed on Nov. 6, 2007.

(51) Int. Cl.
*B32B 17/00*     (2006.01)
*B32B 17/06*     (2006.01)
*B32B 15/00*     (2006.01)

(52) U.S. Cl. ......... 428/410; 428/375; 428/428; 428/432

(58) Field of Classification Search .................. 428/432, 428/435–442, 292.1, 343–354, 40.1, 410 428/428

See application file for complete search history.

(56) References Cited

U.S. PATENT DOCUMENTS

| | | | |
|---|---|---|---|
| 4,224,213 A | | 9/1980 | Johnson |
| 4,235,226 A | | 11/1980 | Scherber et al. |
| 4,364,731 A | * | 12/1982 | Norling et al. ............... 433/218 |
| 5,316,854 A | * | 5/1994 | Lin et al. ...................... 428/426 |
| 5,817,160 A | | 10/1998 | Nagpal et al. |
| 5,825,526 A | * | 10/1998 | Bommarito et al. .......... 359/265 |
| 6,022,619 A | | 2/2000 | Kuhn |
| 6,069,080 A | | 5/2000 | James et al. |

(Continued)

FOREIGN PATENT DOCUMENTS

DE        2504545        8/1978

(Continued)

OTHER PUBLICATIONS

N.P. Huang et al. Poly(L-lysine)-g-poly(ethylene glycol) Layers on Metal Oxide Surfaces: Surface Analytical Characterization and Resistance to Serum and Fibrinogen Adsorption. Langmuir, Jan. 23, 2001; 17(2): 489-498.*

(Continued)

*Primary Examiner* — D. Lawrence Tarazano
*Assistant Examiner* — Ricardo E Lopez

(57) ABSTRACT

An article includes (a) a glass substrate having a modified surface that comprises a glass surface and a layer of nanoscale inorganic oxide particles disposed in contact with and bound to at least a portion of the glass surface, and (b) a polymer layer disposed in contact with and bound to the modified glass surface. A method for improving the hydrolytic stability of an interface of a glass surface and a polymer surface, includes the step of, prior to forming the interface of the glass surface and the polymer surface, treating at least a portion of the glass surface with nanoscale inorganic oxide particles to modify the glass surface by depositing a quantity of such particles on the portion of the surface.

20 Claims, 4 Drawing Sheets

Coated glass panels after immersion in water for 24 hours

U.S. PATENT DOCUMENTS

| | | | |
|---|---|---|---|
| 6,156,409 A | 12/2000 | Doushita et al. | |
| 6,498,000 B2* | 12/2002 | Murasawa et al. | 430/531 |
| 6,680,135 B2* | 1/2004 | Boire et al. | 428/702 |
| 6,830,785 B1 | 12/2004 | Hayakawa et al. | |
| 6,936,399 B2 | 8/2005 | Yamasaki et al. | |
| 6,977,094 B2 | 12/2005 | Oles et al. | |
| 7,128,966 B2 | 10/2006 | Hattori | |
| 2003/0211747 A1 | 11/2003 | Hegde et al. | |
| 2005/0003744 A1 | 1/2005 | Feng et al. | |
| 2005/0064183 A1 | 3/2005 | Lunsford et al. | |
| 2007/0110995 A1* | 5/2007 | Liu | 428/323 |
| 2008/0118804 A1* | 5/2008 | Tucker et al. | 429/30 |
| 2008/0124467 A1 | 5/2008 | Chapel et al. | |
| 2008/0248209 A1 | 10/2008 | Chapel et al. | |

FOREIGN PATENT DOCUMENTS

| | | |
|---|---|---|
| WO | 00/66080 A1 | 11/2000 |
| WO | 01/90263 A2 | 11/2001 |
| WO | 2004/091557 A2 | 10/2004 |
| WO | 2006/138394 A2 | 12/2006 |
| WO | WO 2009061435 A1 * | 5/2009 |

OTHER PUBLICATIONS

Colcote, Products, Chemicals, Products-Chemicals, Ethyl Silicate 40, URL http://www.colcoat.co.JP/e/_chemi/s_etil3.html; retrieved from internet Oct. 6, 2009.

Colcote, Products, Chemicals, Products-Chemicals, HAS (hydrolyzed ethyl silicate solution), URLhttp://www.colcoat.co.jp/e/_chemi/s_has.html; retrieved from internet Oct. 6, 2009.

C.J. Brinker and G.W. Sherer, Sol-Gel Science, Physics and Chemistry of Sol-Gel Processing, Academic Press, San Diego, p. 840-853 (1990).

Jana Striova et al., "Phase Separation in Class II Organically Modified Silicate Films as Probed by Phase-Imaging Atomic Force Microscopy", Langmuir 2005, 21, 6137-6141.

U.P. Muecke et al., Microstructure and electrical conductivity of nanocrystaline nickel- and nickel oxide/gadolinia-doped ceria thin films, Acta Materialia 56 (2008) 677-687 Elsevier.

W.J.E. Beek et al, Efficient Hybrid Solar Cells from Zinc Oxide Nanoparticles and a Conjugated Polymer, Adv. Mater. 2004, 16, No. 12, Jun. 17.

L.V. Saraf et al, Research Letter: Surface and Interface Properties of 10-12 Unit Cells Thick Sputter Deposited Epitaxial $CeO_2$ Films, Research Letters in Material Science, vol. 2008, Article ID 206019 (5 pages) doi: 10.1155/2008/206019 (2008).

T. Zeiler et al.—"Different surface treatments to improve the adhesion of polypropylene", J. Adhesion Sci. Technol., vol. 14, No. 5, pp. 619-634 (2000).

S. Dmitriev et al.—"Water permeability of poly(ethylene) terephthalate track membranes modified in plasma" Elsevier Desalination 146 (2002) pp. 279-286.

E. Rangel et al.—"Investigations on the stability of plasma modified silicone surfaces", Plasmas and Polymers vol. 9, No. 1, pp. 35-48 (2004).

I. Novak et al.—"Influence of processing additives on adhesive properties of surface-modified low-density polyethylene", Macromol. Mater. Eng., 289, pp. 269-274 (2004).

N. Inagaki et al.—"Hydrophobic recovery of plasma-modified film surfaces of ethylene-co-tetrafluoroethylene co-polymer", J. Adhesion Sci. Technol., vol. 17, No. 11, pp. 1457-1475 (2003).

K. Gotoh et al.—:Wettability of ultraviolet excimer-exposed PE, PI and PTFE films determined by the contact angle measurements, Colloids and Surfaces A Physicochemical and Engineering Aspects, 224, pp. 165-173 (2003).

K. Kim et al.—Investigation of crystallinity effects on the surface of oxygen plasma treated low density polyethylene using X-ray photoelectron spectroscopy, Polymer, 44, pp. 6287-6295 (2003).

H. Lim et al.—Wettability of poly(styrene-co-acrylate) ionomers improved by oxygen-plasma source ion implantation, Journal of Polymer Science Part B-Polymer Physics, vol. 41, pp. 1791-1797 (2003).

B. Kim et al.—"Retardation of the surface rearrangement of 02 plasma-treated LDPE by a two-step temperature control", J. Adhesion Sci. Tehnol., vol. 15, No. 14, pp. 1805-1816 (2001).

S. Guimond et al.—"Surface degradation of hydrophobic recovery of polyolefins treated by air corona and nitrogen atmospheric pressure glow discharge", Journal of Applied Polymer Science, vol. 94, pp. 1291-1303 (2004).

J. Kim et al.—"Hydrophobic recovery of polydimethylsiloxane elastomer exposed to partial electrical discharge", Journal of Colloid and Interface Science 226, pp. 231-236 (2000).

N. Medard et al.—"Characterization of $CO_2$ plasma-treated polyethylene surface bearing carboxylic groups" Surface and Coatings Technology 160 (2002), pp. 197-205.

R. Kou et al.—"Surface modification of microporous polypropylene membranes by plasma-induced graft polymerization of α-allyl glucoside", Langmuir 2003, pp. 6869-6875.

F. Poncin-Epaillard et al.—"Reactivity of surface groups formed onto a plasma treated poly(propylene) film" Macromol. Chem. Phys., 200(5), pp. 989-996 (1999).

C. Chan et al.—"Polymer surface modification by plasmas and photons", Surface Science Reports, 24, p. 1-54 (1996).

J. Terlingen et al.—"Introduction of functional groups on polyethylene surfaces by a carbon dioxide plasma treatment", Journal of Applied Polymer Science, vol. 57, pp. 969-982 (1995).

M. Strobel et al.—Flame surface modification of polypropylene film J. Adhesion Sci. Technol., vol. 10, No. 6, pp. 515-539 (1996).

J. Hill et al.—"Effects of aging and washing on UV and ozone-treated poly(ethylene terephthalate) and polypropylene" J. Adhesion Sci. Technol., vol. 9, No. 12, pp. 1575-1591 (1995).

L. Macmanus et al.—"Study of ultraviolet light and ozone surface modification of polypropylene" Journal of Polymer Science: Part A: Polymer chemistry, vol. 37, pp. 2489-2501 (1999).

B. Gongjian et al.—Surface modification of polyolefine by UV light/ ozone treatment, Journal of Applied Polymer Science, vol. 60, pp. 2397-2402 (1996).

H. Frerichs et al.—"Laser-induced surface modification and metallization of polymers", Applied Surface Science, 86, pp. 405-410 (1995).

H. Erbil et al.—"Transformation of a simple plastic into a superhydrophobic surface", Science, 299, pp. 1377-1380 (2003).

D. Siqueira-Petri et al.—"Surface modification of thin polystyrene films", Colloid and Polymer Science, 277, pp. 679-679 (1999).

R. Lawton et al.—"Air plasma treatment of submicron thick PDMS polymer films: effect of oxidation time and storage conditions" Colloids and Surfaces A:Physicochem. Eng. Aspects, 253, pp. 213-215 (2005).

A. Olah et al.—"Hydrophobic recover of UV/ozone treated poly(dimethylsiloxane): adhesion studies by contact mechanics and mechanism of surface modification", Applied Surface Science, 234, pp. 410-423 (2005).

B. Ratner "Surface modification of polymers: chemical, biological and surface analytical challenges", Biosensors & Bioelectronics, 10, pp. 797-804 (1995).

J. Cho et al.—Hydrophilic surface formation on materials and its applications, Surface and Coatings Technology, 128-129, pp. 66-70 (2000).

E. Ada et al.—Chemical modification of polystyrene surfaces by low-energy polyatomic ion beams, J. Phys. Chem. B, vol. 102, No. 20, pp. 3959-3966 (1998).

L. Guzman et al.—Polymer surface modification by ion implantation and reactive deposition of transparent films, Surface and Coatings Technology, 103-104, pp. 375-379 (1998).

R. Bhattacharya "Evaluation of high energy ion-implanted polycarbonate for eyewear applications" Surface and Coatings Technology, 103-104, pp. 151-155 (1998).

M. Strobel et al.—A comparison of gas-phase method of modifying polymer surfaces, J. Adhesion Sci. Technol., vol. 9, No. 3, pp. 365-383 (1995).

J. Lynch et al."Atmospheric pressure plasma treatment of polyethylene via a pulse dielectric barrier discharge; comparison using various gas compositions versus corona discharge in air", Journal of Applied Polymer Science, vol. 71, pp. 319-331 (1999).

S. Schiller et al.—"Chemical structure and properties of plasma-polymerized maleic anhydride films", Chem. Mater., 14, pp. 235-242 (2002).

F. Poncin-Epaillard et al.—"Relations between surface energy and surface potentials of a nitrogen plasma-modified polypropylene" Langmuir, 16, pp. 1450-1453 (2000).

H. Schonherr et al.—Distributions of functional groups in plasma polymerized allylamine films by scanning force microscopy using functionalized probe tips, Chem. Mater., 12, pp. 3689-3694 (2000).

G. Kuhn et al.—"Selective surface functionalization of polyolefins by plasma treatment followed by chemical reduction", Surface and Coatings Technology, pp. 116-119, pp. 796-801 (1999).

J. Lens et al.—"Mechanism of the immobilization of surfactants on polymer surfaces by means of an argon plasma treatment: influence of UV radiation", Plasmas and polymers, vol. 4, No. (2/3), pp. 159-182 (1999).

F. Zhang et al. "Cerium oxide nanoparticles: Size-selective formation and structure analysis" Applied Physics Letters, vol. 80, No. 1, Jan. 7, 2002 (pp. 127-129).

Y. Lee et al. "Surface studies of plasma source ion implantation treated polystyrene" Advanced Analysis Center, Korea Institute of Science and Technology, Seoul 136-791, Korea (received Oct. 13, 1997; accepted Mar. 23, 1998), pp. 2821-2826.

The Free Dictionary (www.freedictionary.com) obtained Jul. 2009.

Encyclopedia Britannica (www.encyclopediabritannica.com) obtained Jul. 2009.

Gong Well (www.gssihop.com) obtained Jul. 2009.

I. Novak et al.—"Investigation of long-term hydrophobic recovery of plasma modified polypropylene", Journal of Materials Science, 39, pp. 2033-2036 (2004).

Non-Final Office Action mailed Nov. 13, 2008 in U.S. Appl. No. 11/729,376.

Final Office Action mailed Aug. 6, 2009 in U.S. Appl. No. 11/729,376.

Non-Final Office Action mailed Dec. 11, 2009 in U.S. Appl. No. 11/729,376.

Non-Final Office Action mailed Jul. 20, 2010 in U.S. Appl. No. 11/729,376.

U.S. Appl. No. 11/729,376—Office action of Dec. 22, 2010.

* cited by examiner

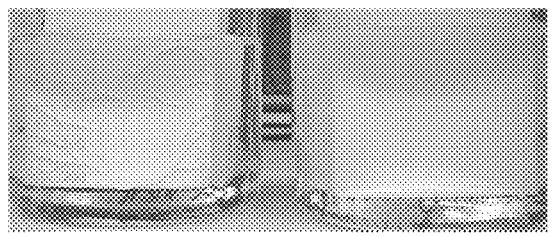
Figure 1: Coated glass panels after immersion in water for 24 hours
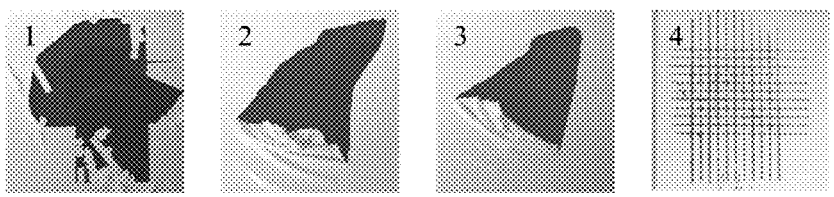
Figures 2.1 -2.4. Coated pre-treated glass panels after immersion in water for 24 hours.
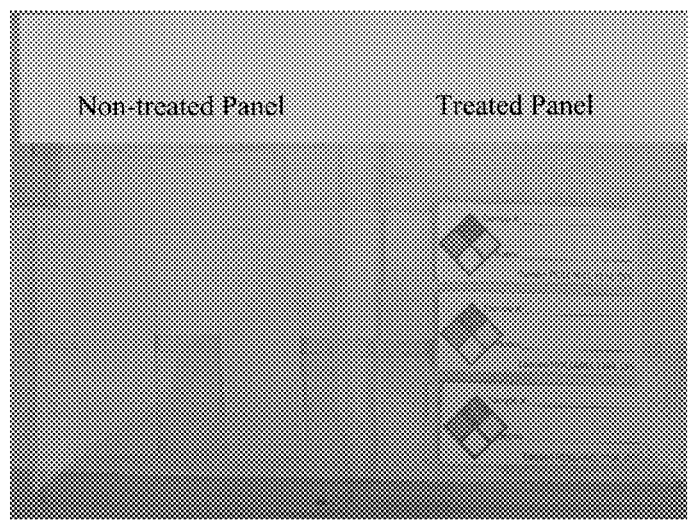
Figure 3: Adhesive backed paper labels on non-treated and nanoparticle-treated glass panels after immersion in boiling water for 1 hour.

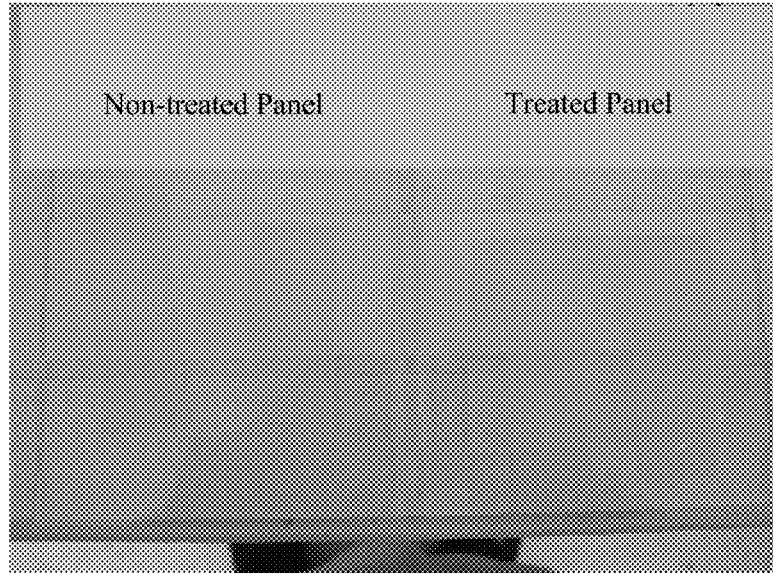
Figure 4: Adhesive backed plastic labels on non-treated and nanoparticle-treated glass panels after immersion in boiling water for 1 hour.
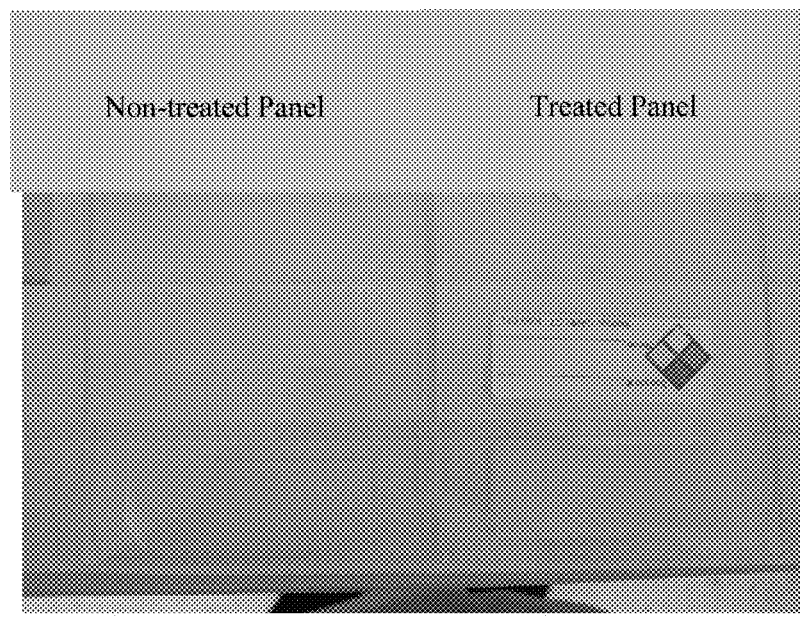
Figure 5: Adhesive backed plastic and paper labels on non-treated and nanoparticle-treated glass panels after immersion in boiling potassium hydroxide solution.

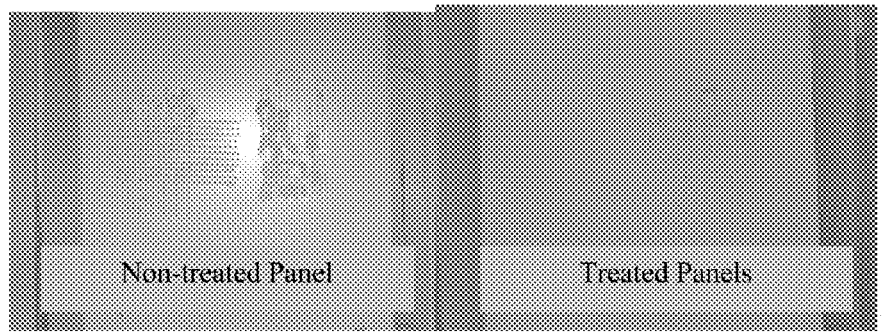
Figure 6: Alkyd coating on non-treated and nanoparticle-treated glass panels after immersion in boiling water for 1 hour.
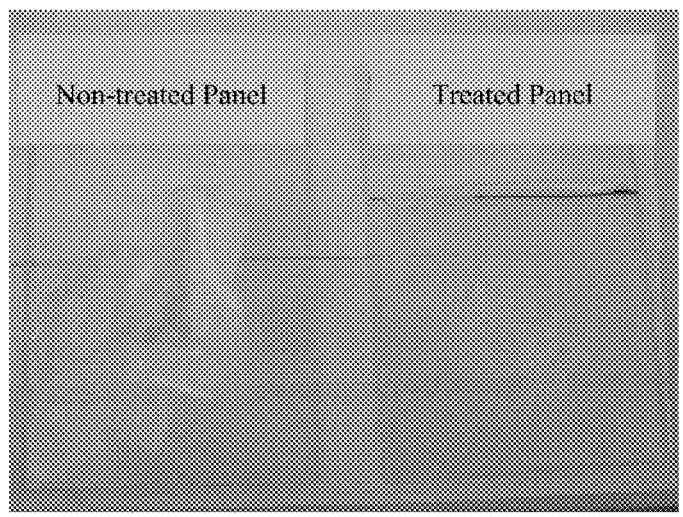
Figure 7: Polyurethane coating on non-treated and nanoparticle-treated glass panels after immersion in boiling water for 1 hour.

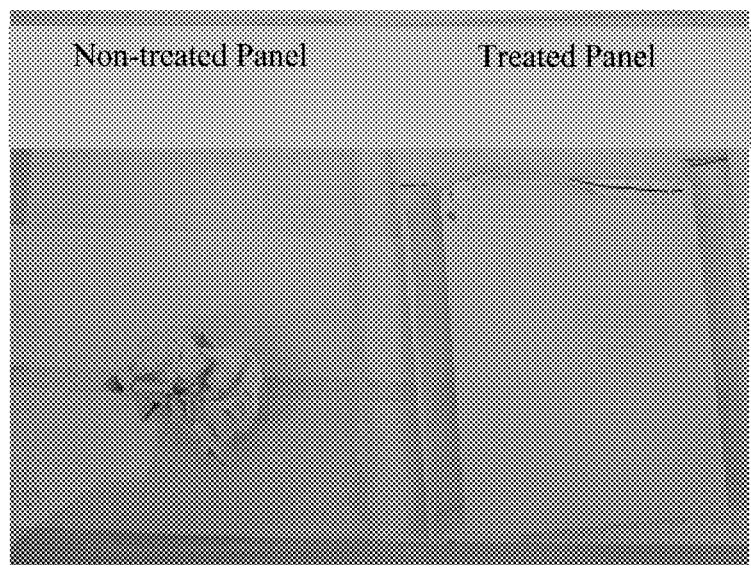
Figure 8: Acrylic enamel coating on non-treated and nanoparticle-treated glass panels after immersion in boiling water for 1 hour

ARTICLES HAVING AN INTERFACE BETWEEN A POLYMER SURFACE AND A MODIFIED GLASS SURFACE

CROSS REFERENCE TO RELATED APPLICATIONS

This application claims the benefit of U.S. Provisional Application No. 61/002,003, filed Nov. 6, 2007.

FIELD OF THE INVENTION

This invention relates to articles having an adhesive interface between a polymer and a glass surface.

BACKGROUND OF THE INVENTION

In many case, it is difficult to form a durable adhesive interface between a polymer, such as a polymer coating or a pressure sensitive adhesive, and a glass surface. This is due to such factors as poor wettability of the glass surface by the polymer, poor adhesion of the polymer to the glass surface, and poor hydrolytic stability of the polymer glass interface, leading to adhesive failure. There are known techniques for improving the wettability, adhesion and hydrolytic resistance of polymer/glass adhesive interfaces, such as treatment of the glass surface with a silane coupling agent prior to forming the polymer/glass interface. However, these techniques are not always effective.

Accordingly, there is a need for an improved approach to making more durable polymer/glass adhesive interfaces.

SUMMARY OF THE INVENTION

In a first aspect, the present invention is directed to an article, comprising:
(a) a glass substrate having a modified surface, comprising a glass surface and a layer of nanoscale inorganic oxide particles disposed in contact with and bound to at least a portion of the glass surface, and
(b) a polymer layer disposed in contact with and bound to the modified glass surface.

In a second aspect, the present invention is directed to a method for improving the hydrolytic stability of an interface of a glass surface and a polymer surface, comprising treating at least a portion of the glass surface with nanoscale inorganic oxide particles to deposit a quantity of the particles on the portion of the surface prior to forming the interface of the glass surface and the polymer surface.

BRIEF DESCRIPTION OF THE DRAWINGS

FIG. 1 shows coated glass panels after immersion in water for 24 hours.

FIGS. 2.1 to 2.4 show coated pre-treated glass panels after immersion in water for 24 hours FIG. 3 shows adhesive-backed paper labels on non-treated and nanoparticle-treated glass panels after immersion in boiling water for 1 hour.

FIG. 4 shows adhesive-backed plastic labels on non-treated and nanoparticle-treated glass panels after immersion in boiling water for 1 hour.

FIG. 5 shows adhesive-backed plastic and paper labels on non-treated and nanoparticle-treated glass panels after immersion in boiling potassium hydroxide solution.

FIG. 6 shows an alkyd coating on non-treated and nanoparticle-treated glass panels after immersion in boiling water for 1 hour.

FIG. 7 shows polyurethane coating on non-treated and nanoparticle-treated glass panels after immersion in boiling water for 1 hour.

FIG. 8 shows acrylic enamel coating on non-treated and nanoparticle-treated glass panels after immersion in boiling water for 1 hour.

DETAILED DESCRIPTION OF INVENTION

The glass substrate component of the present invention may be any amorphous inorganic material, including glasses that contain or are derived from silica ($SiO_2$), such as fused glass, quartz, silicon, soda-lime glass, borosilicate glass, or aluminosilicate glass, and as well as glass substrates that are not based on silica, including glasses derived from phosphates, fluorites, fluorozirconates, fluoroaluminates, chalcogenides, or ceramic materials.

Suitable glasses may optionally further comprise additives for modifying the properties of the glass, including, for example, soda ash, calcium carbonate, metal oxides, such as aluminum oxide, calcium oxide, cerium oxide, magnesium oxide, germanium oxide, or lanthanum oxide, and metals, such as, barium, boron, chromium, copper, lead, iron, gold, titanium, cadmium, or nickel, as well as mixture of metal oxides, metals and metal oxides and metals.

In one embodiment, the glass substrate component of the present invention is a silica based glass, more typically, type "E" glass, which is a aluminoborosilicate glass containing calcium oxide, "S" glass, or "C" glass fibers.

The glass substrate component of the present invention may be of any physical configuration, such as a shaped article, including for example, fibers, plates, flat or shaped sheets, rods, hollow tubes, spheres, flakes, powders, or as a layer, which may be continuous or discontinuous, supported on a second substrate. In one embodiment, the glass substrate is a flat panel, a shaped container, such as a bottle, or a fiber.

In one embodiment, the surface of the glass substrate has a root mean square ("RMS") surface roughness of less than about 200 nm, more typically from about 100 to about 200 nm.

In one embodiment the glass substrate has an RMS surface roughness of less than about 10 nm, more typically less than about 2 nm.

As used herein the terminology "primary particle" means a single discrete particles and the terminology "secondary particle" means an agglomerate of two or more primary particles. A reference to "particles" that does not specify "primary" or "secondary" means primary particles, or secondary particle, or primary particles and secondary particles.

As used herein, the term "nanoscale" in reference to particles means that the particles have a mean particle diameter ("$D_{50}$") of from about 1 to about 1000 nanometers ("nm"). In one embodiment, the nanoscale primary particles have a $D_{50}$ of from about 5 to about 1000 nm, even more typically from about 10 to about 800 nm, and still more typically from about 20 to about 500 nm. In one embodiment, the nanoscale primary particles have a $D_{50}$ of from about 1 to about 500 nm, even more typically from about 1 to about 100 nm, and still more typically from about 1 to about 50 nm. Particle size may be determined using dynamic light scattering.

Suitable inorganic oxides include oxides of single elements, such as cerium oxide, titanium oxide, zirconium oxide, halfnium oxide, tantalum oxide, tungsten oxide and bismuth oxide, zinc oxide, indium oxide, and tin oxide, iron oxide, and mixtures of such oxides, as well as oxides of mixtures of such elements, such as cerium-zirconium oxides.

The inorganic oxide particles may further comprise linked or absorbed ions, such as, for example, metal ions, nitrate ions.

In one embodiment, the inorganic oxide is a crystalline solid. More typically, aqueous sols of particles of the inorganic oxide are stabilized by electrostatic charges and/or hydrostatic forces and subject to destabilization by perturbations of pH, ionic strength, and concentration. Such inorganic oxides are typically synthesized under highly acidic or highly basic reaction conditions.

In one embodiment, the inorganic oxide is selected from iron oxide, zirconium oxide and cerium oxide. More typically, the inorganic oxide is cerium oxide.

Methods for making suitable inorganic oxide particles are known, such as sol-gel techniques, direct hydrolysis of metal alkoxides by water addition, forced hydrolysis of metal salts or by reaction of metal alkoxides with metal halides.

In one embodiment, the nanoscale inorganic oxide particles are made by precipitation of a cerium salt.

In one embodiment, the nanoscale inorganic oxide particles are initially present in the form of a sol, also termed a "slurry", of such particles dispersed in an aqueous medium. Typically, the aqueous medium comprises at least 40 wt %, more typically at least 50 wt % water and even more typically at least 60 wt % water. In one embodiment, the aqueous medium consists essentially of water. The aqueous medium may optionally further comprise one or more water miscible organic liquids, such as for example, tetrahydrofuran, N,N-dimethylformamide, acetonitrile, acetone, $(C_1-C_8)$alkanols such as methanol, ethanol, 2-propanol and diols such as ethylene glycol or, propylene glycol.

In one embodiment, the aqueous medium of the sol comprises, based on 100 parts by weight ("pbw") of such aqueous medium, from about 0 to about 100 pbw, more typically from about 40 to about 100 pbw, and still more typically from about 50 to about 100 pbw water, and from 0 to about 90 pbw, more typically from 0 to about 60 pbw, and still more typically from about 0 to about 50 pbw, of one or more water miscible organic liquids.

The sol exhibits, at least initially, a pH effective to provide a stable sol, that is, a sol wherein the nanoscale inorganic oxide particles tend to remain dispersed in the aqueous medium. In one embodiment, the nanoscale inorganic oxide particle slurry is a stable slurry that comprises nanoscale cerium oxide particles and exhibits a pH of less than or equal to about 5. In another embodiment, the nanoscale inorganic oxide particle slurry is a stable slurry that comprises of zirconium oxide particles and exhibits a pH that is less than or equal to about 4.

In one embodiment, the sol comprises, based on the total weight of the sol, from greater than 0 to about 10 percent by weight (wt %"), more typically from about 0.01 to about 5 percent by weight nanoscale inorganic oxide particles. In one embodiment, the sol comprises from about 0.01 to about 1.0 wt %, and still more typically from about 0.01 to about 0.5 wt %, nanoscale inorganic oxide particles.

In one embodiment, the aqueous medium of the sol further comprises a dissolved electrolyte, in an amount effective to encourage deposition of particles from the sol onto the surface of the substrate without destabilizing the sol. While not wishing to be bound by theory, it is believed that the presence of the electrolyte reduces electrostatic interactions among the nanoscale inorganic oxide particles of the sol and prevents the buildup of an electrostatic charge as nanoscale inorganic oxide particles deposit from the sol onto the surface of the substrate. In one embodiment, the effective amount of electrolyte is from greater than 0 to about 1 pbw, more typically from about 0.01 to about 0.1 pbw electrolyte, per 100 pbw of the aqueous medium, that is, of the combined amount of the water and any water miscible organic liquid components of the sol.

Suitable electrolytes are those that do not destabilize the sol when present in an amount effective to encourage deposition of particles from the sol onto the surface of the substrate and include organic salts, inorganic salts, and mixtures thereof. The electrolyte typically comprises a salt having a cationic component and an anionic component. Suitable cations may be monovalent or multivalent, may be organic or inorganic, and include, for example, sodium, potassium, lithium, calcium, magnesium, cesium, and lithium cations, as well as mono-, di- tri- or quaternary ammonium or pyridinium cation. Suitable anions may be a monovalent or multivalent, may be organic or inorganic, and include, for example, chloride, sulfate, nitrate, nitrite, carbonate, citrate, cyanate acetate, benzoate, tartarate, oxalate, phosphate, and phosphonate anions. Suitable electrolytes include, for example, salts of multivalent anions with monovalent cations, such as potassium pyrophosphate, potassium tripolyphosphate, and sodium citrate, salts of multivalent cations with monovalent anions, such as calcium chloride, calcium bromide, zinc halides, barium chloride, and calcium nitrate, and salts of monovalent cations with monovalent anions, such as sodium chloride, potassium chloride, potassium iodide, sodium bromide, ammonium bromide, alkali metal nitrates, rare earth nitrates, and ammonium nitrates.

In one embodiment, the electrolyte comprises one or more of salts of multivalent anions with monovalent cations and monovalent cations with monovalent anions.

In one embodiment, the electrolyte comprises a monovalent cationic component and a monovalent or multivalent anionic component. In one embodiment, the electrolyte comprises a nitrate salt. Suitable nitrate salts include alkali metal nitrate salts, such as sodium nitrate and potassium nitrate, as well as ammonium nitrate, or a mixture thereof.

In one embodiment, the stable nanoscale inorganic oxide particle sol that contains an electrolyte and nanoscale inorganic oxide particles are deposited from the sol onto a surface of a substrate by contacting the surface with the stable electrolyte-containing nanoscale inorganic oxide particle sol.

In one embodiment, the sol is a stable electrolyte-containing nanoscale cerium oxide particle sol and exhibits a pH that is less than or equal to about 3, more typically less than or equal to about 2.

The surface of the substrate is contacted with the stable electrolyte-containing nanoscale inorganic oxide particle sol and the surface is subsequently rinsed in an aqueous rinse solution.

In one embodiment, the surface of the substrate is contacted with the sol by immersing the substrate in the sol.

The surface of the substrate is contacted with the sol for a period of time effective to allow deposition of a quantity of nanoscale inorganic oxide particles from the sol onto at least a portion of the surface the substrate. For a given sol, longer contact time typically results in deposition of a greater quantity of particles from the sol onto the surface of the substrate. In one embodiment, sufficient contact time is any time greater than 0 seconds, more typically from greater than 0 seconds to about 100 hours. In one embodiment, the contact time is from greater than 0 seconds to about 24 hours, more typically from greater than or equal to about 100 milliseconds to about 5 hours, and even more typically from about 1 second to about 1 hour.

In general, the time period between discontinuing contact of the treated surface with the sol and rinsing the treated surface is not critical. In one embodiment, the treated surface is rinsed to remove any poorly adhered nanoscale inorganic oxide particles from the treated surface. Typically, contact of the surface with the sol is discontinued and the surface is rinsed with the aqueous rinse solution immediately or substantially immediately after the contact of the surface with the sol is discontinued. Optionally, the treated surface may be allowed to dry during the time period after contact of the surface with the sol is discontinued and prior to rinsing.

The aqueous rinse solution comprises water and may, optionally, further comprise up to about 70 wt %, more typically up to about 30 wt %, of a water miscible organic liquid.

In one embodiment, the rinse solution further comprises an electrolyte in an amount effective to discourage desorption of the deposited nanoscale inorganic oxide particles from the treated surface, which is typically from greater than 0 to about 1 wt %, more typically from about 0.01 wt % to about 0.1 wt %, of an electrolyte.

The pH of the rinse solution is not critical. In one embodiment, wherein the nanoscale inorganic oxide particles of the sol are nanoscale cerium oxide particles, the rinse solution exhibits a pH of greater than or equal to 7, more typically, from 7 to about 12, and is more typically from about 10 to about 12.

In one embodiment of the article of the present invention, at least a portion of the nanoscale particles of the layer are disposed in direct contact with the surface of the glass substrate and are bound directly to the surface of the glass substrate. More typically, at least a portion of the nanoscale particles are bound to the surface of the substrate by adsorption of the nanoparticles directly onto the surface of the substrate, in the absence of any bonding agent or interlayer between the nanoparticles and the surface of the substrate.

In one embodiment, the method for improving the hydrolytic stability of an interface of a glass surface and a polymer surface comprises treating at least a portion of the glass surface with nanoscale inorganic oxide particles to modify the portion of the glass surface by adsorption of a quantity of such particles directly onto the portion of the glass surface prior to forming the interface of the glass surface and the polymer surface.

In one embodiment, the layer of nanoscale particles on the surface is a monolayer. As used herein in reference to nanoscale inorganic particles, the term "monolayer" of means a layer that is one particle thick.

In one embodiment, the layer of nanoscale particles on the hydrophobic surface is a discontinuous layer of particles. As used herein in reference to a layer of particles, the term "discontinuous" means that the layer includes regions of void space defined between discrete particles and/or between regions of more closely packed particles.

In one embodiment, the layer of nanoscale particles on the hydrophobic surface is an at least substantially continuous layer of particles. As used herein in reference to a monolayer of particles, the term "continuous" means that the particles of the layer are closely packed so that a typical particle of the layer is substantially surrounded by and in contact with other particles of the layer.

In one embodiment, the substrate containing the deposited inorganic particles may be annealed for extended periods of time at temperatures between 298° K and 773° K, more typically between 298° K and 473° K and even more typically between 298° K and 398° K in an environment that may or may not be saturated with water vapor.

The inorganic oxide particles may comprise surface hydroxyl groups available to undergo condensation with hydroxyl groups of adjacent particles of the layer to form covalent bonds between such particles.

In one embodiment, the layer of nanoscale particles on the surface is an at least substantially continuous monolayer of particles, wherein a typical particle of the layer is substantially surrounded by, in contact with, and bonded to other particles of the monolayer.

The layer of nanoscale inorganic oxide particles modifies the chemical and/or physical properties, for example, the chemical reactivity and/or the surface energy, of the surface modified substrate of the present invention.

As used herein, "hydrophobic surface" means a surface that exhibits a tendency to repel water and to thus resist being wetted by water, as evidenced by a contact angle with water of greater than or equal to 70°, more typically greater than or equal to 90°, "hydrophilic surface" means a surface that exhibits an affinity for water and to thus be wettable by water, as evidenced by a contact angle with water of less than 70°, more typically less than 60°, and even more typically less than 20°, and the "hydrophobic" or "hydrophilic" character of the surface is measured by the contact angle of the surface with water, wherein in each case, the contact angle with water is measured by a conventional image analysis method, that is, by disposing a droplet of water on the surface, typically a substantially flat surface, at 25° C., photographing the droplet, and measuring the contact angle shown in the photographic image.

Water droplet contact angle is awkward to determine with respect to a typical fiber due to the fiber surface configuration, which is due to the lack of a substantially flat surface. A water droplet contact angle measurement that is representative of the fiber surface can conveniently be made using a flat sheet or sample coupon of same material as the fiber of interest. Typically, the treated surface exhibits a water droplet contact angle of less than 70°, more typically less than 60°, even more typically, less than 45°.

In one embodiment, the layer of a polymeric coating is supported on and adhesively bound to the modified glass surface.

In one embodiment, the article of the present invention comprises:
(a) a glass substrate having a modified surface comprising a glass surface and a layer of nanoscale inorganic oxide particles adsorbed onto at least a portion of the glass surface, and
(b) a layer of a polymeric coating supported on and adhesively bound to the modified glass surface.

In one embodiment, the polymer layer comprises an organic coating. Suitable organic coatings include aqueous coatings such as acrylic latex coatings, alkyd coatings, polyester coatings, epoxy coatings and aqueous polyurethane dispersions as well as solvent based coatings such as solvent based polyurethane coatings, polyester coatings, acrylic coatings and solvent based epoxy coatings.

In one embodiment, the organic coating comprises a thermoplastic polymer that exhibits a glass transition temperature of greater than or equal to 5° C., more typically greater than or equal to about 15° C.

In one embodiment, the organic coating comprises a thermoset polymer.

In one embodiment, the surface modified substrate is coated with water borne coating, such as a vinyl latex coating or an acrylic latex coating, and the layer of nanoscale inorganic oxide particles allows application of a continuous layer of water borne coating on the hydrophobic surface of the substrate and typically improves the adhesion of the coating to the substrate.

A common failure mode in the case of a coating on a glass substrate is loss of adhesion after exposure to water. Coated nanoscale inorganic particle treated glass substrates exhibit improved resistance to hydrolysis at the glass/coating interface, improved resistance to loss of adhesion in the presence of water and/or water vapor, and improved durability and useful life span.

In one embodiment, the article of the present invention is a lamellar article that comprises:
(a) a glass substrate having a surface,
(b) a layer of nanoscale inorganic oxide particles disposed in contact with and bound to at least a portion of the surface,
(c) a paper or a polymer sheet disposed on at least a portion of the layer of nanoscale inorganic oxide particles and
(d) a layer of adhesive polymer disposed between the paper or polymer sheet and the nanoscale inorganic oxide particle layer that is bound to the nanoscale inorganic oxide particle layer and is bound to the paper or a polymer sheet.

In one embodiment, the layer of adhesive polymer is disposed between the paper or polymer sheet and the modified surface, adhesively bound to the modified surface and adhesively bound to the paper sheet or the polymer sheet.

In one embodiment, the article f the present invention is lamellar article, comprising
(a) a glass substrate having a modified surface comprising a glass surface and a layer of nanoscale inorganic oxide particles adsorbed onto at least a portion of the glass surface,
(b) a paper sheet or a polymer sheet supported on at least a portion of modified surface, and
(c) a layer of adhesive polymer disposed between the paper or polymer sheet and the modified surface and adhesively bound to the modified surface and to the paper sheet or polymer sheet.

In one embodiment, the glass substrate is a glass container and the surface is an outer surface of the container.

In one embodiment, the paper or polymer sheet and adhesive polymer layer is an adhesive label affixed to the nanoscale inorganic oxide particle modified surface of the glass substrate.

In one embodiment, the adhesive polymer layer is a pressure sensitive adhesive composition comprising a polymer having a glass transition temperature of less than 5° C., more typically from about −20° C. less than 5° C. In one embodiment, the adhesive polymer layer comprises an acrylic polymer.

A common failure mode in the case of, e.g., pressure sensitive adhesive labels on a glass substrate, is loss of adhesion after exposure to water. Adhesive labeled nanoscale inorganic particle treated glass substrates exhibit improved resistance to hydrolysis at the glass/adhesive label interface, improved resistance to loss of adhesion in the presence of water and/or water vapor, and improved durability and useful life span.

In one embodiment, the article of the present invention is a composite structure wherein the polymer (b) comprises a polymer matrix and the glass substrate (a) comprises a glass reinforcement dispersed in the polymer matrix to reinforce the polymer matrix.

In one embodiment, the article of the present invention is a glass fiber reinforced composite article, comprising:
(a) a polymer matrix, and
(b) glass fibers, at least a portion of which have a modified surface comprising a glass surface and a layer of nanoscale inorganic oxide particles adsorbed onto at least a portion of the glass surface, disposed in the polymer matrix to reinforce the matrix.

As used herein, the term "fiber" means a generally elongated article having a characteristic longitudinal dimension, typically a "length", and a characteristic transverse dimension, typically a "diameter" or a "width", wherein the ratio of the characteristic longitudinal dimension to the characteristic transverse dimension is greater than or equal to about 10. In one embodiment the fibers are relatively short fibers having an aspect ratio of form about 10 to less than 50. In another embodiment, the fibers are relatively long fibers, having an aspect ration of greater than about 50, more typically greater than or equal to about 100.

In one embodiment, the glass substrate comprises a glass fabric substrate comprising a plurality of glass fibers.

In one embodiment, the surface modified glass fibers are further modified by treatment with a reactive silane layer.

In one embodiment, the polymer matrix is a thermoplastic polymer such as for example, a thermoplastic polyester polymer, thermoplastic polyamide polymer, a polyethylene polymer or a polypropylene polymer.

In one embodiment, the polymer matrix is a thermoset polymer, such as for example, a thermoset polyester polymer or a thermoset epoxy polymer.

In one embodiment, the glass fibers are short glass fibers dispersed in the polymer matrix.

In one embodiment, the fibers are long glass fibers.

In one embodiment, the glass fibers are in the form of a woven fabric, a nonwoven fabric, or a chopped fiber mat.

In one embodiment the composite article is a molded article comprising a thermoplastic polymer matrix and short nanoscale inorganic particle treated glass fibers dispersed in the matrix. In one embodiment, the composite article comprises a matrix selected from thermoplastic polyester polymers, thermoplastic polyamide polymers, polyethylene polymers and polypropylene polymers and short nanoscale inorganic particle treated E glass fibers dispersed in the matrix. Suitable articles can be made by known polymer processing, such as, for example, injection molding, techniques.

In one embodiment, the composite article comprises a thermoplastic or thermoset polymer matrix and long nanoscale inorganic particle treated glass fibers dispersed in the matrix, wherein the long nanoscale inorganic particle treated glass fibers are oriented in a pattern within the matrix. In one embodiment, the long nanoscale inorganic particle treated glass fiber reinforced composite article is a wound glass fiber reinforced polymer matrix composite article. Suitable composite articles can be made by known filament winding techniques.

In one embodiment, the composite article is a laminate structure comprising stacked layers of polymer impregnated nanoscale inorganic particle treated glass fabric, and the nanoscale inorganic particle treated glass fabric comprises nanoscale inorganic particle treated non-woven glass fibers, nanoscale inorganic particle treated woven glass fibers, or nanoscale inorganic particle treated braided glass fibers. Suitable composite articles can be made by known lay-up techniques.

In one embodiment, the composite article is a laminate comprising stacked layers of polyamide impregnated nanoscale inorganic particle treated nonwoven E-glass fabric.

In each case, a typical composite article failure mode is delamination at the fiber surface/matrix interface. Composite articles made using nanoscale inorganic particle treated glass fibers exhibit improved resistance to hydrolysis at the glass/ matrix interface, improved resistance to delamination in the presence of water and/or water vapor, and improved durability and useful life span.

EXAMPLE 1

The silanized glass slides of Examples 1 and 1C were made as follows.

The silanzed glass slides of Example 1 were made by treating glass microscope slides (Corning) by immersion for 5 minutes in a 1 wt % solution of cerium oxide whose pH had been adjusted to 3. The slides were then rinsed in distilled water and air dried at room temperature. The treated slides were then soaked in a 10 wt % solution of hexadecyltrimethoxy silane for 1 minute and then placed in a heated oven at 120° C. After 2 hours, the silane treated slides was allowed to cool to room temperature under vacuum for over 8 hours. The cooled glass slides were rinsed in boiling toluene for 5 minutes and then air dried. The receding contact angle of water on the surface of these slides was 86°.

The silanized glass slides of Example 1C were made using glass slides that had not been previously treated with a nanoparticle dispersion. For the slides of Example 1C, the receding contact angle of water after silanization with hexadecyltrimethoxy silane using the procedure described earlier is measured to be 77°. This result shows that pretreating the glass with a cerium oxide dispersion enhances the efficiency of a silanization treatment in increasing the hydrophobic character of the glass.

The silanized glass slides were hydrolyzed in water at 80° C. for 2 hours. The receding contact angles of water on the hydrolyzed glass slides of Example 1 dropped from 86° to 68°. Hydrolysis of the silanized glass slides of Examples 1C which had not been treated with cerium oxide in water at 80° C. for 2 hours resulted in receding contact angles of water dropping from 77° to 49°. This result shows that pretreating the glass with a cerium oxide dispersion enhances the hydrolytic stability of a silane treated glass surface.

EXAMPLES 2 AND 2C

The coated glass substrates of Example 2 and 2C were made as follows.

Cerium-oxide treated glass panels were made by dipping plates of float glass with a cerium oxide dispersion by dipping the plates in a 0.1 wt % dispersion of cerium oxide nanoparticles (~5 nm in diameter) in water, with pH adjusted to 2 and containing 0.1 moles/liter of sodium nitrate.

Coated glass panels were made by applying a waterborne acrylic coating using a motorized/automatic film applicator (Elcometer 4340) to obtain a thickness of 15 mils and allowed to cure for a minimum of three days. The coated panel of Example 2-1 was made by coating the cerium oxide treated glass panels. The coated panels of Example 2C-1 was made by coating the non-treated glass panels.

The adhesion of the coating to the panels was evaluated using a cross hatch test according to ASTM test method D 3359-02. In Examples 2 and 2C as well as the Examples below, the cross hatch test was conducted by cutting a lattice pattern with eleven cuts in each direction in the coating, applying a pressure-sensitive tape over the lattice and then rapidly removing the tape. Adhesion is evaluated by determining the fraction of the coating that is removed by the tape. Typically, if there is no loss of the coating, the adhesion is categorized as "5B". The cured coating was found to have good adhesion to both the treated panel of Example 2-1 and non-treated panel of Example 2C-1 in dry condition (Adhesion result 5B in each case).

The coated panels were immersed in cold water for 24 hours. The coated panel of Example 2C-1 showed extensive blistering. This blister formation is believed to occur due to the presence of water at the glass-polymer interface and dramatically degrades the adhesion of the coatings to glass. FIG. 1 shows the coated glass panels after immersion in water for 24 hours; the untreated glass panel of Example 2C-1 is on the left and the cerium oxide treated glass panel of Example 2-1 is on the right. Blistering of the coating applied to cerium oxide treated glass panel of Example 2-1 was negligible, compared to the blistering of the coating on the non-treated panel of Example 2C-1.

After the panels of Examples 2-1 and 2C-1 were removed from the water, they were each allowed to dry for 1 hour and then subjected to a cross hatch test. The results from this test are shown in FIG. 2. There was a dramatic improvement in the adhesion of the coating (adhesion result 5B) to the treated panel of Example 2 compared to the non-treated panel of Example 2C.

Four glass panels were then subjected to the following treatments:

the panel of Example 2C-2 was soaked 5 min in water pH 1.5.
the panel of Example 2C-3 was soaked 5 min in a solution 0.1 M $NaNO_3$
the panel of Example 2C-4 was soaked 5 min in a solution 0.1 M $NaNO_3$ @ pH 1.5, and
the panel of Example 2-2 was soaked 5 min in cerium oxide dispersion.

Each of the panels was removed from its respective treatment solution, rinsed with deionized water, and allowed to dry. After drying, the acrylic paint was applied as described above, to each of the four panels. The coated panels were then soaked in cold water for 24 hours. FIGS. 2.1 to 2.4 show the coated pre-treated glass panels of Examples 2C-2, 2C-3, 2C-4, and 2-2 after immersion in water for 24 hours; 2.1 shows the panel of Example 2C-2, 2.2 shows the panel of Example 2C-3, 2.3 shows the panel of Example 2C-4, and 2.4. shows the panel of Example 2-2. Blistering of the coating was observed on all the panels of Examples 2C-2, 2C-3, and 2C-4, but not the cerium oxide-treated panels of Example 2-2. The coated panel of Example 2-2 passed the cross hatch test (adhesion result 5B), while the panels of Example 2C-2, 2C-3, and 2C-4 each failed the test (adhesion result (ASTM result: 0B).

EXAMPLES 3 AND 3C

The paper label/glass laminates of Examples 3 and 3C were made and tested as follows. The paper label/glass laminate of Example 3 was made by applying six adhesive backed paper labels (Avery Dennison) were applied to cerium oxide treated panels (each treated as described above in Example 2) such that each face of the panel had three labels. The paper label/glass laminate of Example 3C was made by applying adhesive backed paper labels in an analogous manner to an untreated clean glass panel.

The paper label/glass laminate of Examples 3 and 3C were simultaneously immersed in beaker of boiling water for one hour, inclined at an angle of 20-30° relative to the walls of the beaker. FIG. 3 shows adhesive backed paper labels on glass panels after being immersed in boiling water for 1 hour; the untreated glass panel of Example 3C is on the left, the cerium treated glass panel of Example 3 is on the right. The labels that were applied to the cerium oxide treated glass panel of Example 3 did not delaminate. However, three of the labels from the untreated glass panel of Example 3C delaminated from the side of the panel of Example 3C that was facing the bottom of the beaker and were removed from the glass surface.

EXAMPLE 4 AND 4C

The polymer adhesive label/glass laminates of Example 4 and 4C were made and tested as follows. The polymer adhesive label/glass laminates of Example 4 by applying six adhesive backed plastic labels (Avery Dennison) were applied to a cerium oxide treated glass panel (treated as described above in Example 2) such that each face of the panel had three labels. The paper label/glass laminate of Example 4C was made by applying adhesive backed plastic labels in an analogous manner to an untreated clean glass panel.

The polymer adhesive label/glass laminates of Example 4 and 4C were simultaneously immersed in beaker containing boiling water for one hour, inclined at an angle of 20-30° relative to the walls of the beaker. FIG. 4 shows adhesive backed plastic labels on glass after being immersed in boiling water for 1 hour; the untreated glass panel of Example 4C is on the left and the cerium treated glass panel of Example 4 is on the right The labels that were applied to the cerium oxide treated glass panel of Example 4 did not delaminate. However, three of the labels from the untreated glass panel of Example 4C delaminated from the side of the panel facing the bottom of the beaker and were removed from the glass surface.

EXAMPLE 5 AND 5C

The paper label and polymer label/glass laminates of Examples 5 and 5C were made and tested as follows. The paper label and polymer label/glass laminates of Example 5 was made by applying one adhesive backed paper label and one adhesive backed plastic label on each face of the cerium oxide treated glass panel (treated as described above in Example 2). The paper and polymer label/glass laminate of Example 5C was made by applying adhesive backed plastic labels in an analogous manner to an untreated clean glass panel The paper label and polymer label/glass laminates of Examples 5 and 5C were simultaneously immersed in beaker containing boiling potassium hydroxide solution, inclined at an angle of 20-30° relative to the walls of the beaker, for 1 hour and then allowed to remain in this solution for 2 days at room temperature. FIG. 5 shows adhesive backed plastic and paper labels on glass after being immersed in boiling potassium hydroxide solution; the untreated glass panel of Example 5C is on the left and the cerium treated glass panel of Example 5 is on the right. The labels that were applied to the cerium oxide treated glass panels of Example 5 did not delaminate. However, one plastic label and one paper label from the untreated glass panels of Example 5C delaminated from the side of the panel facing the bottom of the beaker and were removed from the glass surface.

EXAMPLE 6 AND 6C

The enamel coated glass panels of Examples 6 and 6C were made and tested as follows. The enamel coated glass panels of Examples 6 were made by applying a coating of alkyd enamel (Kem aqua alkyd enamel, Sherwin Williams) to a cerium oxide treated glass panel (treated as described above in Example 3) using a motorized/automatic film applicator (Elcometer 4340) to obtain a thickness of 15 mils and allowed to cure for a minimum of three days. The coated glass panel of Example 6C was made by applying a coating of the enamel to a non-treated glass panel in an analogous manner.

A cross hatch pattern was scored on the coatings on each the panels and the panels were immersed in boiling water for 1 hour. FIG. 6 shows alkyd film-coated glass panels after immersion in boiling water for 1 hour; the untreated glass panel of Example 6C is on the left and the cerium treated glass panel of Example 6 is on the right. At least some blistering of the coating was observed on the panel of Example 6 and the panel of Example 6C. The extent of blistering was lower on panel of Example 6 than the panel of Example 6C.

The panels were then allowed to dry and the adhesion of the coating on each panel was tested using the cross hatch test. There was no difference in the adhesion of the coatings on the treated and untreated panels.

EXAMPLE 7

The polyurethane coated glass panels of Example 7 were made and tested as follows. A coating of a water borne polyurethane dispersion was applied on a cerium oxide treated glass panel as well as on an untreated glass panel and cured according to the conditions described previously. After a cross hatch pattern was scored on the coatings on both the panels, the panels were immersed in boiling water for 1 hour. FIG. 7 shows polyurethane coatings on glass panels after immersion in boiling water for 1 hour; the untreated glass panel of Example 7C is on the left and the cerium treated glass panel of Example 7 is on the right. The coating on the untreated panel delaminated from glass surface within 15 minutes of immersion in boiling water. Similar delamination was not observed for the coating on the treated panel over the entire duration of the test.

EXAMPLE 8

The acrylic coated glass panels of Example 8 were made and tested as follows. A coating of the acrylic enamel (surface enamel high gloss acrylic latex, Sherwin Williams) was applied on a cerium oxide treated glass panel as well as on an untreated glass panel and cured according to the conditions described previously. After a cross hatch pattern was scored on the coatings on both the panels, the panels were immersed in boiling water for 1 hour. FIG. 8 shows acrylic enamel coatings on glass panels after immersion in boiling water for 1 hour; the untreated glass panel of Example 8C is on the right and cerium treated glass panel of Example 8 is on the right. The coating on the untreated panel delaminated from glass surface within 15 minutes of immersion in boiling water. Similar delamination was not observed for the coating on the treated panel over the entire duration of the test. The treated panel was then dried and the adhesion of the coating on glass was tested using the cross hatch test. The coating showed excellent adhesion on the treated surface (5B).

EXAMPLE 9

Zirconium-oxide treated glass panels were made by dipping plates of float glass in a 1 wt % dispersion (Alfa Easer) of zirconium oxide nanoparticles (~5 nm in diameter) in water, with pH adjusted to 3 and containing 0.1 moles/liter of sodium nitrate.

Coated glass panels were made by applying a waterborne acrylic coating using a motorized/automatic film applicator (Elcometer 4340) to obtain a thickness of 15 mils and allowed to cure for a minimum of three days. The coated panel of Example 9 was made by coating the cerium oxide treated glass panels. A cross hatch pattern was scored on the coatings on the panel and the panel was immersed in boiling water for 1 hour. No blisters were observed in the panel. After removing the panel from hot water, it was dried, allowed to cool for 30 minutes and tested for adhesion using the cross hatch test. The coated panel of Example 9 passed the cross hatch test (adhesion result 5B).

The invention claimed is:

1. An article, comprising:
    (a) a glass substrate having a modified surface comprising a glass surface and a layer of nanoscale inorganic oxide particles disposed in contact with and bound to at least a portion of the glass surface, wherein at least a portion of the nanoscale inorganic oxide particles are bound to the glass surface by adsorption of the nanoscale particles directly onto the glass surface, wherein the layer of nanoscale inorganic oxide particles is a monolayer of nanoscale inorganic oxide particles; and
    (b) a polymer layer disposed in contact with and bound to the modified glass surface, wherein the polymer layer is a layer of a polymeric pressure sensitive adhesive.

2. The article of claim 1, wherein the glass is derived from silica.

3. The article of claim 1, wherein the glass substrate is a flat panel, a shaped container, or a fiber.

4. The article of claim 1, wherein the inorganic oxide comprises an inorganic oxide selected from iron oxide, zirconium oxide and cerium oxide.

5. The article of claim 1, wherein the inorganic oxide comprises cerium oxide.

6. The article of claim 1, wherein the nanoscale inorganic oxide particles consist of nanoscale inorganic oxide particles bound to the glass surface by adsorption on the nanoscale particles directly onto the glass surface.

7. The article of claim 1, wherein the layer of nanoscale inorganic oxide particles consists of the monolayer of nanoscale inorganic oxide particles.

8. The article of claim 1, wherein the glass substrate is a flat glass panel.

9. An article, comprising:
    (a) a glass substrate having a modified surface comprising a glass surface and a layer of nanoscale inorganic oxide particles disposed in contact with and bound to at least a portion of the glass surface, wherein at least a portion of the nanoscale inorganic oxide particles are bound to the glass surface by adsorption of the nanoscale particles directly onto the glass surface, wherein the layer of nanoscale inorganic oxide particles is a monolayer of nanoscale inorganic oxide particles; and
    (b) a polymer layer disposed in contact with and bound to the modified glass surface,
        wherein the article further comprises a paper sheet or a polymer sheet disposed on at least a portion of the layer of nanoscale inorganic oxide particles and the polymer layer (b) of the article is a layer of an adhesive polymer disposed between the paper or polymer sheet and modified glass surface that is bound to the modified glass surface and is bound to the paper sheet or the polymer sheet.

10. The article of claim 9, wherein the inorganic oxide comprises an inorganic oxide selected from iron oxide, zirconium oxide and cerium oxide.

11. The article of claim 9, wherein the inorganic oxide comprises cerium oxide.

12. An article, comprising:
    (a) a glass substrate having a modified surface comprising a glass surface and a layer of nanoscale inorganic oxide particles disposed in contact with and bound to at least a portion of the glass surface, wherein at least a portion of the nanoscale inorganic oxide particles are bound to the glass surface by adsorption of the nanoscale particles directly onto the glass surface, wherein the layer of nanoscale inorganic oxide particles is a monolayer of nanoscale inorganic oxide particles; and
    (b) a polymer layer disposed in contact with and bound to the modified glass surface,
        wherein the article is a composite structure wherein the polymer (b) comprises a polymer matrix and the glass substrate (a) comprises a glass reinforcement dispersed in the polymer matrix.

13. The article of claim 12, wherein the inorganic oxide comprises an inorganic oxide selected from iron oxide, zirconium oxide and cerium oxide.

14. The article of claim 12, wherein the layer of nanoscale inorganic oxide particles consists of the monolayer of nanoscale inorganic oxide particles bound to the glass surface by adsorption of the nanoscale particles directly onto the glass surface.

15. The article of claim 12, wherein the inorganic oxide comprises cerium oxide.

16. A method for making an article comprising:
    (a) a glass substrate having a modified surface comprising a glass surface and a layer of nanoscale inorganic oxide particles disposed in contact with and bound to at least a portion of the glass surface, wherein at least a portion of the nanoscale inorganic oxide particles are bound to the glass surface by adsorption of the nanoscale particles directly onto the glass surface, wherein the layer of nanoscale inorganic oxide particles is a monolayer of nanoscale inorganic oxide particles; and
    (b) a polymer layer disposed in contact with and bound to the modified glass surface, wherein the polymer layer is a layer of a polymeric pressure sensitive adhesive, to improve the hydrolytic stability of an interface of the glass surface and a surface of the polymer, comprising:
        treating at least the portion of the glass surface with the nanoscale inorganic oxide particles to modify the glass surface by depositing such particles on the portion of the glass surface prior to forming the interface of the glass surface and the polymer surface, and
        disposing the polymer layer in contact with and bound to the modified glass surface.

17. A lamellar article, comprising
    (a) a glass substrate having a modified surface comprising a glass surface and a layer of nanoscale inorganic oxide particles adsorbed onto at least a portion of the glass surface, wherein at least a portion of the nanoscale inorganic oxide particles are bound to the glass surface by adsorption of the nanoscale particles directly onto the glass surface, wherein the layer of nanoscale inorganic oxide particles is a monolayer of nanoscale inorganic oxide particles,
    (b) a paper sheet or a polymer sheet supported on at least a portion of modified surface, and
    (c) a layer of adhesive polymer disposed between the paper or polymer sheet and the modified surface and adhesively bound to the modified surface and to the paper sheet or polymer sheet.

18. The article of claim 17, wherein the inorganic oxide comprises cerium oxide.

19. A glass fiber reinforced composite article, comprising:
(a) a polymer matrix, and
(b) glass fibers, at least a portion of which have a modified surface comprising a glass surface and a layer of nanoscale inorganic oxide particles adsorbed onto at least a portion of the glass surface, disposed in the polymer matrix to reinforce the polymer matrix, wherein at least a portion of the nanoscale inorganic oxide particles are bound to the glass surface by adsorption of the nanoscale particles directly onto the glass surface, wherein the layer of nanoscale inorganic oxide particles is a monolayer of nanoscale inorganic oxide particles.

20. The article of claim 19, wherein the inorganic oxide comprises cerium oxide.

* * * * *